United States Patent [19]
Solie et al.

[11] 3,945,610
[45] Mar. 23, 1976

[54] TIMBER FELLING DEVICE

[75] Inventors: James C. Solie; Daniel L. Doss; Jerald Lee Waldrop, all of Owatonna, Minn.

[73] Assignee: Owatonna Tool Company, Owatonna, Minn.

[22] Filed: Feb. 10, 1975

[21] Appl. No.: 548,181

[52] U.S. Cl. .................... 254/93 R; 144/34 A
[51] Int. Cl.² ................. B66F 3/24; A01G 23/08
[58] Field of Search ........... 254/30, 93 R, 104, 133, 254/86 H; 144/34 R, 34 A, 34 B; 91/449

[56] References Cited
UNITED STATES PATENTS

| | | | |
|---|---|---|---|
| 2,343,937 | 3/1944 | Smith | 254/86 H |
| 2,690,323 | 9/1954 | Evenson | 144/34 A |
| 2,764,249 | 9/1956 | Paolucci | 254/86 H |
| 2,792,670 | 5/1957 | Haynes | 144/34 B |
| 2,919,106 | 12/1959 | Mieux et al. | 254/86 H |
| 3,471,949 | 10/1969 | Cargile | 91/449 |
| 3,622,124 | 11/1971 | Sidles | 254/93 R |
| 3,730,481 | 5/1973 | Ekonen | 254/93 R |
| 3,749,363 | 7/1973 | Hauser | 254/45 |
| 3,773,292 | 11/1973 | Thiermann | 254/30 |
| 3,819,153 | 6/1974 | Hurst | 254/93 R |

FOREIGN PATENTS OR APPLICATIONS

56,155  11/1912  Austria ................. 144/34 A

*Primary Examiner*—Al Lawrence Smith
*Assistant Examiner*—Robert C. Watson
*Attorney, Agent, or Firm*—Wegner, Stellman, McCord, Wiles & Wood

[57] ABSTRACT

A portable timber felling device for controlled felling of a tree including a hydraulic ram unit positionable in a backcut of the tree for extension therein to fell the tree. A hydraulic power unit includes a pump and control valves to generate and regulate the hydraulic power required to operate the hydraulic ram unit. A hose means of a considerable length interlinks the power and ram units for the transmission of the generated hydraulic power. A remote control unit with a manually operable control member controls at least one of the valves on the power unit via a communication means which places the operator of the remote control at a substantial distance from the power unit and the tree to be felled. The entire structure is portable and a battery provides the electrical power for remote control.

12 Claims, 5 Drawing Figures

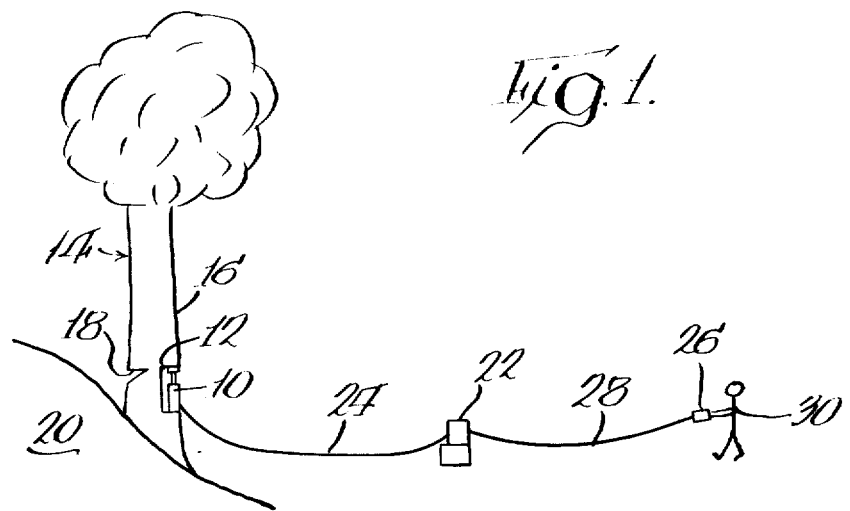
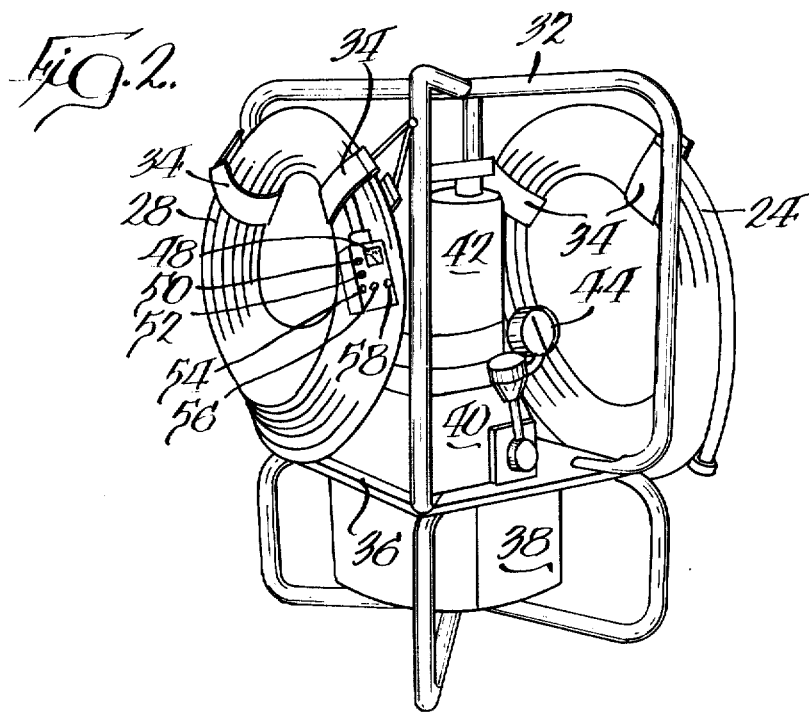

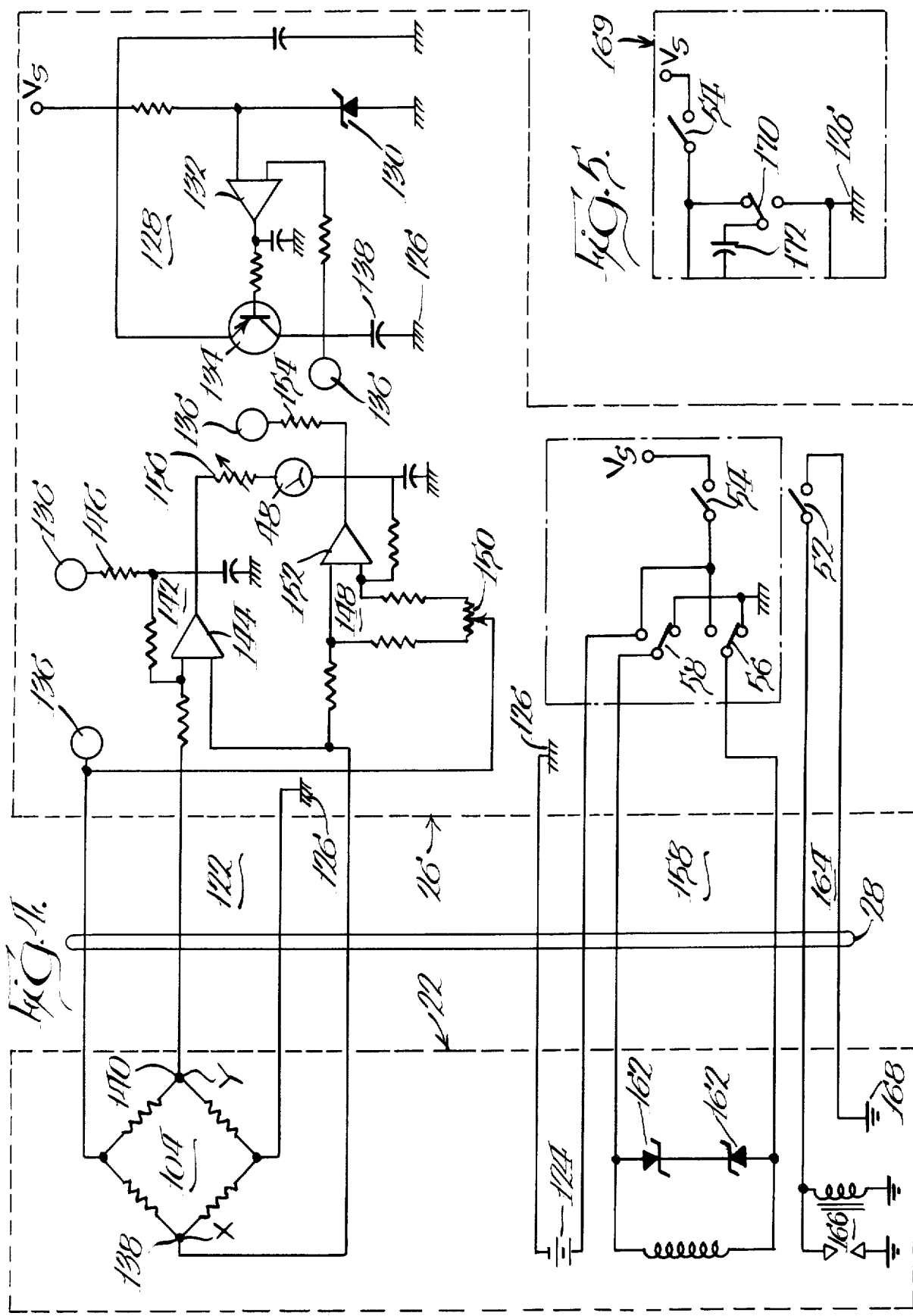

3,945,610

TIMBER FELLING DEVICE

BACKGROUND OF THE INVENTION

This invention relates to a portable timber felling device for controlled felling of a tree with safety.

Pertinent prior art includes the following U.S. Patents: Evenson No. 2,657,904; Evenson No. 2,690,323 and Thiermann No. 3,773,292.

In certain prior art devices, a hydraulic wedge member was inserted into a kerf in a tree for felling. The wedge member, besides being unduly cumbersome, had the distinct disadvantage of having the hydraulic valves and the manual levers to operate the same located on the wedge, which placed the operator in a dangerous position. In addition, a second person was necessary to operate a chain saw engine which drove a hydraulic pump member connected between a reservoir and the wedge. The reservoir and pump were often heavy and bulky so that a truck or a similar vehicle was required to carry them to the felling site. This factor precluded such a felling device being used on steep slopes or other terrain inaccessible to a motor vehicle.

In other prior art devices the valves and manual controls thereto were located adjacent the hydraulic pump member instead of being on the wedge member. However, the operators were still close enough to the felled tree when operating the controls to be hit by flying debris. Moreover, these wedge members developed into a rather complicated structure which offered negligible control over the direction in which the tree might fall. Inaccurate felling of a tree often resulted in increased breakage and lower lumber yields especially on steep hillsides as well as damage to nearby timber.

SUMMARY OF THE INVENTION

It is a primary object of the present invention to provide a portable timber felling device which improves job safety for the operator while felling trees.

Another object of the present invention is to provide a portable timber felling device which can easily be backpacked by a single operator over terrain inaccessible to motor vehicles.

A further object of the present invention is to provide a portable timber felling device which allows accurate felling of a tree even on steep slopes and in which the accurate felling reduces breakage and increases lumber yield without damage to adjacent trees.

A still further object of the present invention is to provide a portable timber felling device which is activated by manually operable controls on a remote control unit so that the operator is located a safe distance away from the tree and flying debris during the felling operation.

In accordance with the present invention, a portable timber felling device for causing the controlled felling of a tree includes a hydraulic ram unit which is positioned in the backcut of a tree and is extended to cause the felling of the tree. A hydraulic power unit generates hydraulic power for the ram unit and it includes a pump and control valves. A hose extends between the power unit and the ram unit to transmit the generated hydraulic power. A remote control unit has a manually operable control member for at least one of the control valves on the power unit. The remote control unit is placed in communication with one of the control valves while it is at a substantial distance from the power unit.

One feature of the invention is the provision of an electrically operated valve for controlling fluid to the ram unit in which the valve is operated by a momentary electric pulse from a battery powered circuit. More particularly, the valve is a solenoid valve which is opened by a momentary electric pulse and remains in the open position until another momentary pulse of the opposite polarity is received.

Another feature is the provision of a pressure transducer on the power unit which produces a signal that is read by a meter on the remote control unit to indicate the hydraulic pressure within the system.

A further feature of the invention is a manually operable control on the remote control unit which disables the engine on the power unit so that in case of an emergency or malfunction the pressure to the ram unit can be stopped immediately.

BRIEF DESCRIPTION OF THE DRAWINGS

Further features and advantages of the invention will readily be apparent from the following specification and from the drawings, in which:

FIG. 1 is a diagrammatic illustration of a tree on a hillside about to be felled by a timber felling device embodying the invention;

FIG. 2 is a perspective view of the apparatus in its backpacking position;

FIG. 4 is a schematic diagram of the electrical circuits thereof; and

FIG. 5 is a schematic diagram of a second embodiment of the solenoid switching circuit disclosed in FIG. 4.

DESCRIPTION OF THE PREFERRED EMBODIMENT

Figure 3:
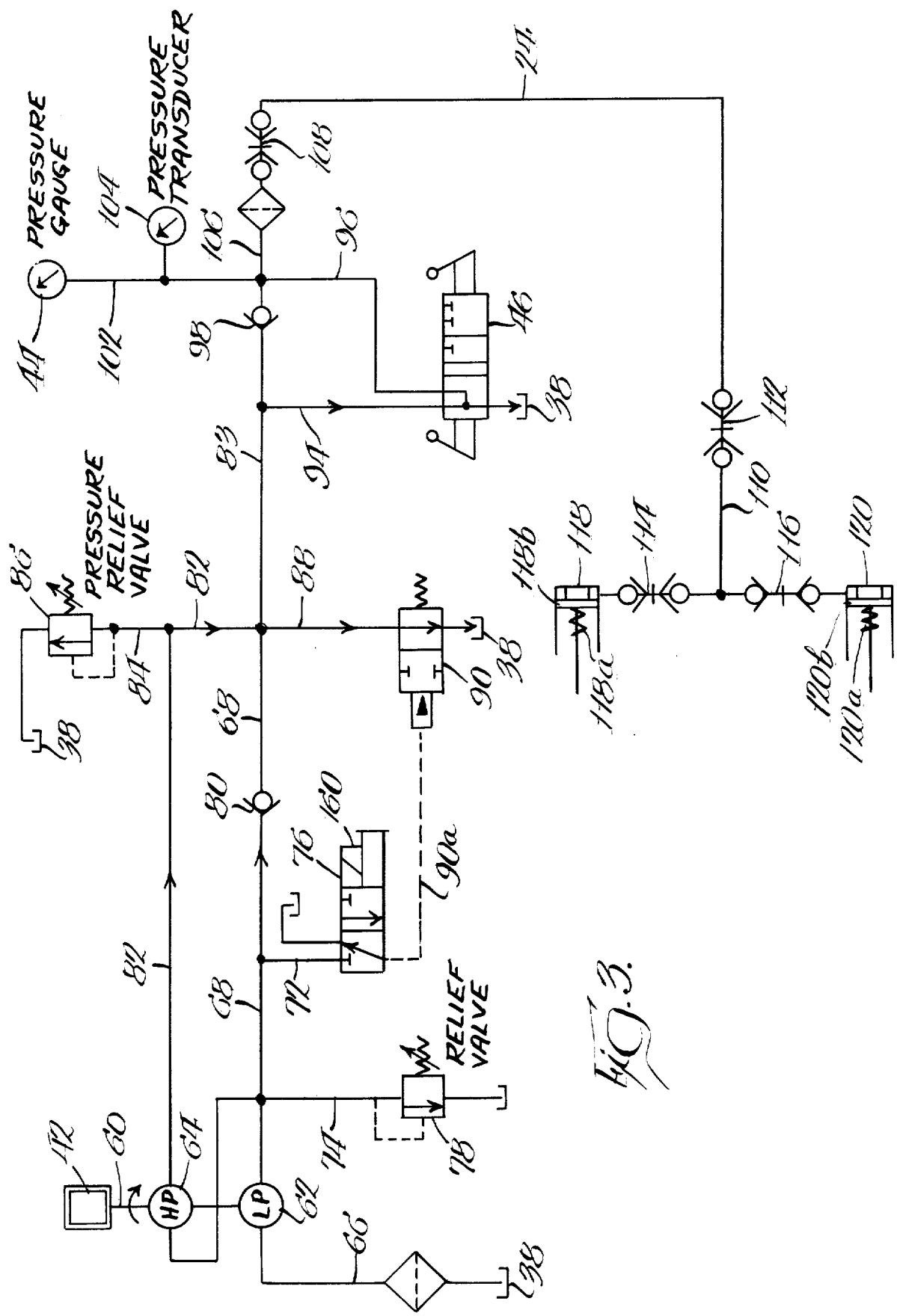
FIG. 3 is a schematic diagram of the hydraulic circuits thereof.

One embodiment of the portable timber felling device for causing the controlled felling of a tree is illustrated in FIG. 1, and includes a hydraulic ram unit 10 which is positioned in a backcut 12 of a tree 14. Preferably, the ram unit 10 includes one or more hydraulic rams each of which has a bottom plate and a top plate that is mounted on a movable piston in a cylinder. The plates are designed to concentrate the force at the center of the piston which reduces off center loading. Also, the base for the plates should be as level as possible which requires the backcut 12 in the tree 14 to be cut accordingly. The rams are placed well inside the tree bark 16 for best results. The tree 14 has an undercut 18 opposite the backcut 12 which faces toward the hillside 20 so that the tree 14 will fall to the left (FIG. 1) when the rams are extended. This can provide any desired direction of fall for the tree including an uphill felling when it is desirable to reduce breakage and thereby increase lumber yield. The rams 10 are extended by the fluid power from a hydraulic power unit 22 via a hydraulic hose 24. The fluid power from the power unit to the ram unit 10 is regulated by a remote control unit 26 which has manually operable control members for at least one of the control valves on the power unit to be described later in detail. The remote control unit 26 communicates with the power unit 22 by an electrical cable 28.

In the preferred embodiment, the hydraulic hose 24 and the electrical cable 28 are each approximately 50 feet in length so that an operator at the remote control unit 26 can stand at a substantial distance, approximately 100 feet, from the base of the tree 14. Thus the operator 30 is safely away from flying debris when the tree is felled and yet he can accurately control the felling.

The power unit 22 is illustrated in greater detail in FIG. 2. Preferably, all of the power unit components are constructed of lightweight and durable materials for easy portability on a backpacking frame 32. The hydraulic hose 24 and electrical cable 28 are attached to the frame 32 by carrying straps 34. A horizontal mounting plate 36 fastened to the frame 32 divides the frame into upper and lower portions. The lower frame portion has a fluid reservoir 38 secured to the bottom of plate 36. The upper frame portion has a hydraulic pumping unit 40 secured to the top of the plate 36. A gasoline engine 42 is mounted on top of the pumping unit 40 and is in direct operative engagement with a pump therein. A pressure gauge 44 is connected to the pumping unit 40 to indicate the output pressure of the system. A 3-way valve 46 with a push-pull lever is connected to the pumping unit 40 for controlling the fluid power of the system.

As also seen in FIG. 2, an enlargement of the operating face on the remote control unit 26 is depicted with a pressure meter 48 and the following manual button controls: a zero adjust screw 50 for the pressure meter 48, an engine kill switch 52, a meter read switch 54, a ram extend switch 56, and a ram hold switch 58. The operable electric circuit means between the power unit and remote control unit will be described in more detail subsequently.

Turning now to FIG. 3, the hydraulic power circuit is illustrated with the cylinders of the rams in their retract position. Generally, this circuit has a low pressure stage for pilot fluid and ram unit extension with a high pressure stage for felling a tree. The direction control of ram extension or retraction and ram hold is by the 3-way valve 46 and with movement of the ram unit determined by a remote solenoid operated valve 76. The engine 42 rotates a shaft 60 which drives a pump in the pumping unit 40 that has a low pressure stage 62 and a high pressure stage 64. The low pressure stage 62 receives fluid from the reservoir 38 through a filtered inlet line 66 and supplies fluid power to a low pressure output line 68. The low pressure line 68 has three branch lines 70, 72 and 74. Branch line 70 delivers fluid to the inlet port of the high pressure stage 64. The branch line 72 provides pilot fluid to the inlet port of a 3-way, normally closed, solenoid valve 76 with a manual override. The branch line 74 extends to the reservoir 38 and has a normally closed relief valve 78 whereby when the pressure on line 68 exceeds a predetermined value, the valve opens to discharge fluid into the reservoir 38. In addition, the low pressure line 68 has a ball check valve 80 which opens in the direction of the low pressure flow.

The high pressure stage 64 of the pump receives fluid at its inlet port under low pressure and supplies fluid under a high pressure to an outlet line 82. A relief line 84 connects with outlet line 82 and to the pump reservoir 38 through a pressure relief valve 86. In addition, the high pressure line 82 is connected to the low pressure line 68 with the check valve 80 preventing flow from the high pressure line through the low pressure line 68.

A branch line 88 from the high pressure line 82 extends to a 2-way, normally open, valve 90 which is pilot controlled by vavle 76. In the open position, the valve 90 exhausts the fluid in the high pressure line 82 to the pump reservoir 38. When the valve 90 is closed by a signal from valve 76, the fluid in the high pressure line is directed to the hose 24 through a ball check valve 98 in a line 83.

A branch line 94 from line 83 has a 3-way, manually operable, valve 46. In FIG. 3, the 3-way valve 46 is shown in a ram retract position. In this position, the fluid power in line 83 is exhausted through branch line 94 to the pump reservoir 38 as is the flow from hose 24 through a line 96 leading to the valve 46.

The check valve 98 permits fluid flow toward the hose 24 but blocks flow in the opposite direction.

The valve 46 has a hold position for the ram unit wherein line 94 is open to the reservoir 38 and the line 96 is blocked. A third position of the valve for ram extension has both lines 94 and 96 blocked.

Assuming now that the valve 46 is positioned to close branch line 94, the fluid in the line 83 would flow through the check valve 98 to a line junction 100. The junction 100 has a pressure branch line 102 with a pressure transducer 104 and the pressure gauge 44 and connects a filtered output line 106 of the pumping unit 40. With the valve 46 in the ram extend position with lines 94 and 96 closed, the fluid power flows through a quick disconnect coupler 108 with two check valves which open upon coupling of the coupler 108 to the hydraulic hose 24.

The hydraulic hose 24 connects to one end of a Y-connected hose 110 by a quick disconnect coupler 112. The other two ends of the Y-connected hoses 110 extend through quick disconnect couplers 114 and 116 to the jack cylinders 118 and 120, respectively, of the ram unit 10. The cylinders 118 and 120 include return springs 118a and 120a, acting on the pistons 118b and 120b in the cylinders.

As shown in FIG. 3, the solenoid valve 76 is deenergized with the manual override inoperative. The line 72 is blocked and the pilot line 90a is open to the reservoir 38. The valve 90 is in its normally open position and is exhausting the fluid from the line 88 to the reservoir 38. The manual valve 46 is in the ram retract position. Any fluid passing through line 83 is being exhausted through the branch line 94 to the reservoir and the cylinders 118 and 120 are also connected to the reservoir.

For extension of the jack cylinders of the ram unit 10, the manual valve 46 is shifted to the position wherein both lines 94 and 96 are blocked from communication with the reservoir 38. An operator can then move to a distance from the tree and with the remote control unit operate the valve 76, as described hereinafter, to connect the branch line 72 to the pilot line 90a which shifts the valve 90 and blocks the line 88 from communication with the reservoir 38. Fluid under pressure is then directed to the cylinders 118 and 120. Also described hereinafter, another pulse of the solenoid 160 will return valve 76 to the position shown in FIG. 3 which operates to hold the cylinders 118 and 120 in their extended position with return flow being blocked both at the valve 46 and by the check valve 98 and the pump flow returns to reservoir 38 through valve 90.

The operable electric circuit means which operates the power unit 22 by remote control 26 is shown in FIG. 4. An operating voltage for a remote control meter circuit 122 and the solenoid 160 of the valve 76 is provided by a battery 124 which may be an alkaline throw-away battery or a rechargeable battery with a chassis ground 126 on the remote control unit 26 and with a mounting on the power unit 22. Alternatively, since the battery is sufficiently small and lightweight, it may be mounted in the remote control unit.

In accordance with a preferred form of the invention, an operating voltage $V_S$ is provided for the remote control meter circuit 122 by the battery 124 when the meter read button on the remote control unit 26 is depressed and held, which closes a spring-loaded, normally open, switch 54. This supplies a voltage to a voltage regulator circuit 128 which is part of integrated meter circuit on a printed circuit board enclosed within the remote control unit 26. The voltage regulator circuit 128 includes a zener diode 130 for providing a reference voltage and an operational amplifier 132 (of a voltage follower configuration) with a transistor 134 at its output to provide driving capabilities. An output 136 of the voltage regulator circuit 128 has a capacitor 138 between the output lead and the chassis ground 126 to eliminate any oscillations of the amplifier 132 which are caused by switching transients.

With the switch 54 closed and the output 136 of the voltage regulator connected across the input to the pressure transducer 104, there is a current flow across a resistive bridge network of the transducer. The measured potential at points 138 and 140 on the resistive network of the transducer 104 produces an electrical output which is proportional to the pressure sensed in the hydraulic system. The pressure-related signals from points 138 and 140 are fed to a meter drive circuit 142 where a differential amplifier 144 responds to the difference between the two signals to produce an output current that drives the pressure meter 48. A pull-up resistor 146 is connected between the output of the amplifier 144 and the output 136 of the voltage regulator 128 which maintains the amplifier's output voltage and supplies the required current to drive the meter 48.

A unity gain circuit 148 completes the remote control meter circuit 122. The purpose of this circuit is to maintain point X at the same potential as point Y in the resistive circuit of the transducer 104, which allows the meter 48 to be referenced to chassis ground 126 without loading the transducer. In addition, the zero adjust screw 50 adjusts a potentiometer 150 which changes the input to differential amplifier 152 so that offset currents and voltages can be provided to permit a zero adjustment of the meter 48. A pull-up resistor 154 is connected between the supply voltage 136 and the output of the amplifier 152 to prevent loading of the same. In addition, when the three-way valve 46 is in the ram extend position and the pressure gauge 44 is reading approximately 7500 P.S.I., the meter 48 can be calibrated to equal the reading on the pressure gauge 44. This is accomplished by adjusting a variable resistor 156 in series between the output of the amplifier 144 and the meter 48 until equal readings are obtained.

A solenoid circuit 158 for the three-way solenoid valve 76 includes extend and hold switches 56 and 58, respectively on the remote control unit 26. The valve, as an example, may be a Skinner magnelatch valve with a manual override, Model V53, which is manufactured and sold by Skinner Electric Valve Div. of Skinner Precision Industries, Inc. of New Britain, Conn. Unlike a conventional solenoid valve which requires a continuous flow of current through the coil to hold the plunger in one position, the magnelatch valve operates by means of a permanent magnet latch circuit. This latch circuit allows the valve to be controlled by a momentary current pulse of 20 milliseconds in duration. An operating current pulse for the solenoid 160 of the valve 76 is provided by the battery 124 when the operator closes momentarily either the ram extend or hold switches 56 and 58, respectively, by pushing the corresponding buttons on the remote control unit.

For example, if the operator pushes the ram extend button, then the valve shifts to a latch position which is equivalent to the energized position on a conventional solenoid valve. A magnet in the valve circuit holds the plunger in the latch position without drawing current from the battery 124. This prolongs battery life. In the latch position, the valve 76 normally pilots the valve 90 to closed position. When an operator pushes the button to operate the hold switch 58, a momentary pulse of opposite polarity unlatches the valve. The unlatch position is a release position which is equivalent to the de-energized position of a conventional solenoid valve. The spring-biased valve 90 opens to exhaust the fluid in line 88 to the reservoir while check valve 98 presents a backflow of fluid from the ram unit 10. The solenoid circuit 158 further includes a pair of back-to-back zener diodes 162 which are in parallel with the coil 160 to provide a clipping circuit to protect other circuitry from harmful voltage and current transients.

An engine kill circuit 164 is another feature of the invention. The engine 42 has an engine primary 166 which is connected via the normally open push-button switch 52 on the remote control unit to a ground 168 on the power unit. If the operator wants to stop the engine, he closes the engine kill switch 52 which shorts the engine primary to ground.

FIG. 5 shows another embodiment of the switching elements 169 for the solenoid valve circuit. A single pushbutton switch 170 on the remote control unit releases and latches the plunger of valve 76. The switch 170 is normally in the ram hold position and this causes the battery 124 to charge a capacitor 172 in series between the battery and solenoid coil 160. As a result, the valve 76 remains in the release or unlatched position. When the switch is closed by pushing the button 170, the capacitor rapidly discharges, which causes a reverse current pulse across the coil 160 to latch the plunger and to activate the pilot control of valve 76. Upon the release of the push button switch 170, the capacitor 172 starts to recharge, which causes a current pulse of opposite polarity across the coil 160 to unlatch the valve plunger and cut off the pilot oil to the valve 90. The capacitor 172 gives this circuit the same battery saving feature of the solenoid circuit in FIG. 4.

In operation, the hydraulic power unit 22 is placed on the ground out of the path in which the tree 14 might fall. The hydraulic rams are placed into the backcut 12 of the tree and the connected hydraulic hoses 24 and 110 are coupled to the pump unit 40 and the ram unit 10, respectively. The remote control unit 26 is connected to the power unit 22 via the electric cable 28. The three-way hydraulic valve 46 is manually placed in the ram retract position. The ram hold switch 58 is depressed and released to put the plunger of the three-way solenoid valve 76 in the release position. Next, the gasoline engine 42 is started and the engine speed is set at one-half to two-thirds throttle. Valve 46 on the power unit 22 is shifted to the ram extend position. The pump unit 40 is now controlled by the ram extend and hold buttons 56 and 58, respectively, on the remote control unit 26. To read the pressure within the system during operation, the meter switch button 54 is depressed and held for reading meter 48. After the tree is felled, the operator depresses and holds the engine kill switch button 52 until the engine stops. The operator then places the lever of the three-way valve 46 on the power unit in the ram retract position and waits for the pistons on the rams to completely return before disconnecting the hydraulic hoses. After a short cooling period for the engine's muffler, the hydraulic hoses and electric cable can be strapped to the backpacking frame 32 and the timber tipper apparatus is carried to the next job site.

Moreover, in an emergency, when the battery becomes discharged or the remote control unit fails after the last remote operation performed was ram extend, the power unit may be operated manually with the three-way valve 46 on the power unit. On the other hand, if the last performed remote operation was ram hold, the manual override on valve 76 must be placed in the "on" position before manually operating the lever on valve 46. During the normal remote control operation the manual override must be placed in the "off" position.

We claim:

1. A portable timber felling device for causing controlled felling of a tree comprising, a hydraulic ram unit positionable in a pre-cut recess of a tree for extension to cause the felling of the tree, a transportable hydraulic power unit separate from the ram unit for generating hydraulic power for said ram unit and including a pump and control valves, hose means extended between the power unit and the ram unit, a pressure transducer on said power unit and in circuit with the ram unit for detecting the pressure in the ram unit, a remote control unit with a manually operable control member for at least one of said control valves and a pressure gauge, and means placing said remote control unit in communication with said one control valve and said pressure gauge in communication with said pressure transducer while at a substantial distance from said power unit.

2. A device as defined in claim 1 wherein said one control valve is an electrically operated valve, and said communication means includes a battery powered circuit for operation of said electrically operated valve.

3. A device as defined in claim 2 wherein said communication means includes a length of electric cable.

4. A device as defined in claim 3 wherein said hydraulic power unit and battery are on a backpack frame, and means for removably attaching said hose means, said remote control unit and said electric cable to the backpack frame.

5. A device as defined in claim 2 wherein said one control valve has two positions and a solenoid operator therefor with means for placing said control valve in alternate ones of the two positions by a momentary energization of the solenoid and with said control valve remaining in said one alternate position after deenergization of the solenoid.

6. A device as defined in claim 1 wherein said hydraulic ram unit includes a plurality of extensible jack cylinders.

7. A device for felling trees including a power unit having an engine, a pump driven by the engine, a reservoir, and a plurality of control valves, a ram unit separate from the power unit positionable in a tree recess and extensible under pressure to fell a tree; hose means connecting said power unit to said ram unit; said control valves including a first valve in circuit with said hose means to either connect the hose means to said reservoir for retraction of the ram unit or to block said last-mentioned connection, a second pilot operated valve for causing the pump output to flow either to said hose means or to reservoir, and a third pilot valve for controlling the operation of said second valve; and a remote control unit at a distance from said power unit for operating said third pilot valve.

8. A device as defined in claim 7 wherein said third pilot valve has one position to direct pilot fluid to said second valve and another position to relieve pilot fluid from the second valve, and means responsive to a momentary electrical pulse to sequence said third pilot valve from one position to the other.

9. A device as defined in claim 8, wherein successive momentary electrical pulses are of sequentially opposite polarity and provided by a circuit, comprising:

a chassis ground on said remote control unit;

a voltage source for providing said momentary electrical pulses and having a pair of terminals with one terminal connected through a conductor to the chassis ground;

a switch on said remote control unit having a first position connecting said responsive means with the other terminal of said voltage source and a second position connecting said responsive means to chassis ground;

a capacitor in series between the switch in said first position and said responsive means being charged by said battery for establishing a momentary electrical pulse of one polarity across said responsive means and being discharged to chassis ground when the switch is in said second position for establishing a momentary electrical pulse of an opposite polarity across said responsive means.

10. A device as defined in claim 7 wherein said pump has first and second stages connected to said hose means with said third pilot valve being in circuit with said low pressure stage, and check valve means in parallel with said second valve to permit pump output to flow to said hose means with bypass of the second valve but blocking said bypass of return flow from said hose means.

11. A device as defined in claim 10 wherein said second pilot operated valve is positioned upstream of said check valve means whereby said ram unit may be held in an extended position by said check valve means when said second pilot operated valve is positioned to direct pump output to the reservoir.

12. A device as defined in claim 11 wherein said remote unit includes a switch in electrical circuit with a solenoid for said third pilot valve.

* * * * *

UNITED STATES PATENT AND TRADEMARK OFFICE
CERTIFICATE OF CORRECTION

PATENT NO. : 3,945,610
DATED : March 23, 1976
INVENTOR(S) : James C. Solie; Daniel L. Doss; Jerald Lee Waldrop.

It is certified that error appears in the above-identified patent and that said Letters Patent are hereby corrected as shown below:

IN THE DRAWINGS:

Sheet 1, Fig. 2, the reference numeral 46 should be applied to the valve appearing immediately to the right of reference numeral 40.

Sheet 2, Fig. 3, reference numeral 70 should be applied to the hydraulic line leading into the left-hand side of pump 64;

In the same Figure, the reference numeral 100 should be applied to the hydraulic line junction immediately to the right of check valve 98.

Sheet 3, Fig. 4, the reference numeral 160 should be applied to the coil appearing to the left of the zener diodes 162.

Signed and Sealed this

Fourteenth Day of December 1976

[SEAL]

Attest:

RUTH C. MASON
*Attesting Officer*

C. MARSHALL DANN
*Commissioner of Patents and Trademarks*